COX & NEWTON.
Harvesting Machine.
No. 18,628.  Patented Nov. 17, 1857.
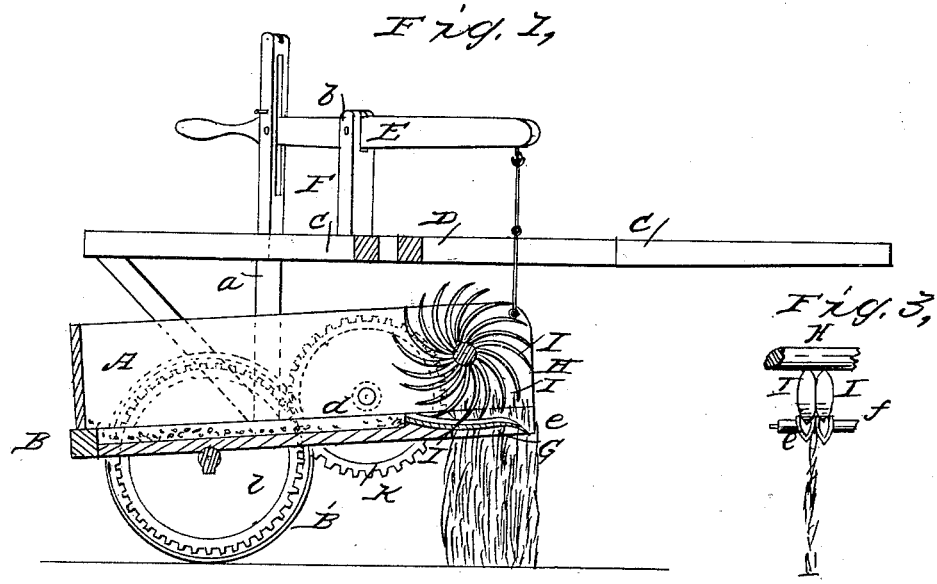
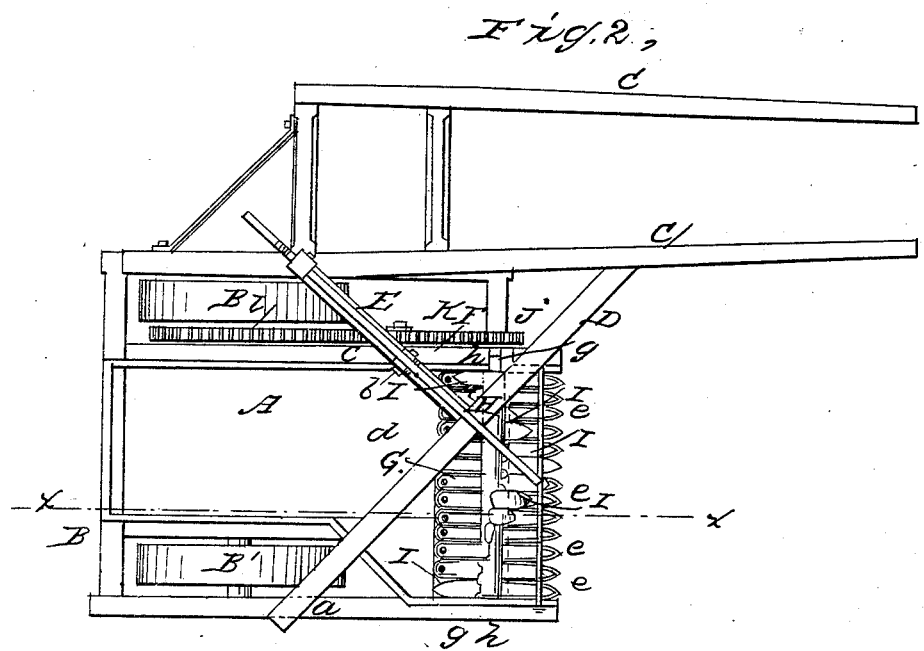

UNITED STATES PATENT OFFICE.

JOHN C. COX AND REUBEN NEWTON, OF GREENVILLE, ASSIGNORS TO HOSEA LINDSAY AND J. D. HYMAN, OF ASHEVILLE, N. C.

IMPROVED HARVESTING-MACHINE.

Specification forming part of Letters Patent No. 18,628, dated November 17, 1857.

*To all whom it may concern:*

Be it known that we, JOHN C. COX and REUBEN NEWTON, of Greenville, in the county of Pitt and State of North Carolina, have invented a new and Improved Harvesting-Machine; and we do hereby declare that the following is a full, clear, and exact description of the same, reference being had to the annexed drawings, making a part of this specification, in which—

Figure 1 is a longitudinal vertical section of our improvement, taken in the line $x\,x$, Fig. 2. Fig. 2 is a plan or top view of the same. Fig. 3 is a detached front view of two of the revolving teeth, two of the comb-teeth, and a portion of the clearing-roller.

Similar letters of reference indicate corresponding parts in the several figures.

The object of this invention is to gather grain from the heads of standing straw in the field, the straw being left in an uncut state.

The invention consists in the peculiar means employed for effecting the purpose—to wit, a comb formed of concave teeth attached to the front end of a mounted seed-box, and used in connection with revolving teeth and a clearing-roller, arranged as hereinafter described.

To enable those skilled in the art to fully understand and construct our invention, we will proceed to describe it.

A represents a seed-box, which is placed on a frame, B, said frame being mounted on two wheels, B′ B′; and C represents the shafts, which are attached to a frame, D, said frame being secured to the upper ends of uprights $a$, the lower ends of which have tenons on them, said tenons being fitted in mortises in the sides of the frame B, the mortises being sufficiently large to allow a requisite degree of play, so that the front end of the seed-box may be raised and lowered by means of a lever, E, the fulcrum $b$ of which is at the upper part of an upright, F, attached to a bar, $c$, of the frame D.

To the front end of the bottom $d$ of the seed-box A a comb, G, is attached. This comb is formed of a series of metal teeth, $e$, placed side by side, and having suitable spaces allowed between them. The front ends of the teeth are pointed and curved downward, as shown clearly in Fig. 1, and the teeth transversely are of concave form, so that their upper surfaces form a series of parallel grooves or channels, as shown plainly in Fig. 3.

To the under side of the frame B, and at the front end of the bottom $d$, a roller, $f$, is placed, said roller being allowed to turn freely in its bearings. The roller is below or at the under side of the teeth $e$, as shown clearly in Fig. 1.

H is a shaft, which is placed transversely in the seed-box A at its front part and some distance above the comb G, said shaft being about over the center of the comb, and having its journals $g$ fitted in slotted uprights $h\,h$, attached to the frame B.

To the shaft H there is attached a series of curved or hooked teeth, $i$, said teeth being attached to the shaft H, so as to form a spiral row of one or more turns. (See Figs. 1 and 2.) The sides of the teeth $i$, at their broadest parts, are in a line with each other, or about in the same plane, (see Fig. 3,) and the teeth $i$ are placed directly over or in a line with the teeth $e$ of the comb G, the points of the teeth $i$, as they rotate, passing into the grooves or channels of the teeth $e$. The shaft H has a pinion, $j$, at one end, and this pinion gears into a wheel, $k$, the axis of which is secured to one side of the seed-box A, said wheel $k$ gearing into a wheel, $l$, attached to the hub of one of the wheels B′.

The operation is as follows: As the machine is drawn along the spaces between the teeth $e$ receive the heads of the straw, the comb G being elevated or depressed by means of the lever E, so that it will just be below the heads of the straw. (Shown in red.) The teeth $i$, as the shaft H rotates, scrape or shell the grain from the heads, the heads being caught between the teeth $i$, and the grain, falling into the channels or grooves, are forced out therefrom and backward into the box A by the teeth $i$, the points of which, as before stated, extend downward within said grooves. The heads are prevented from being broken or cut from the straw by the roller $f$, which allows a free egress of the same from between the teeth $e$. Were the rollers $f$ not employed, the heads of the straw would be liable to be broken off, as the front end of the bottom $d$ would not allow them to pass out freely from between the teeth e.

We do not claim separately either of the parts herein described; but

We claim as new and desire to secure by Letters Patent—

The comb G, in combination with the rotating teeth i and roller f, constructed and arranged substantially as and for the purpose set forth.

JOHN C. COX.
REUBEN NEWTON.

Witnesses:
 WILLIAM WORTHINGTON,
 TITUS HART.